United States Patent
Nan et al.

(10) Patent No.: US 9,680,513 B2
(45) Date of Patent: Jun. 13, 2017

(54) SIGNAL TRANSCEIVER

(71) Applicant: Spreadtrum Communications (Shanghai) Co., Ltd., Shanghai (CN)

(72) Inventors: Chaozhou Nan, Shanghai (CN); Jiewei Lai, Shanghai (CH)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 66 days.

(21) Appl. No.: 14/642,635

(22) Filed: Mar. 9, 2015

(65) Prior Publication Data

US 2016/0127005 A1  May 5, 2016

(30) Foreign Application Priority Data

Oct. 31, 2014 (CN) .......................... 2014 1 0607974

(51) Int. Cl.
*H04B 1/44* (2006.01)
*H04B 1/18* (2006.01)
*H04B 1/04* (2006.01)

(52) U.S. Cl.
CPC ............. *H04B 1/18* (2013.01); *H04B 1/0458* (2013.01)

(58) Field of Classification Search
None
See application file for complete search history.

(56) References Cited

U.S. PATENT DOCUMENTS

| | | | | |
|---|---|---|---|---|
| 7,065,327 B1* | 6/2006 | Macnally | ................. | H04B 1/48 455/78 |
| 7,756,486 B1* | 7/2010 | Tan | ........................ | H04B 1/525 323/222 |
| 8,099,062 B1* | 1/2012 | Terrovitis | ................. | H04B 1/48 455/73 |
| 2011/0285475 A1* | 11/2011 | Lu | ............................ | H04B 1/48 333/104 |
| 2012/0295556 A1* | 11/2012 | Chien | ....................... | H03F 1/56 455/78 |

* cited by examiner

*Primary Examiner* — Zhiyu Liu

(74) *Attorney, Agent, or Firm* — Vierra Magen Marcus LLP

(57) ABSTRACT

A signal transceiver is provided. The signal transceiver includes: signal convert circuit adapted to convert single-ended signals into differential signals; first power amplifier; receiving amplifier; impedance convert circuit; first capacitive circuit; second capacitive circuit; and first switch circuit; wherein output terminals of the signal convert circuit are connected with output terminals of the first power amplifier and first set of terminals of the first capacitive circuit; second set of terminals of the first capacitive circuit is connected with first set of terminals of the impedance convert circuit; second set of terminals of the impedance convert circuit is connected with input terminals of the receiving amplifier and first set of terminals of the second capacitive circuit; second set of terminals of the second capacitive circuit is connected with first set of terminals of the first switch circuit; and second set of terminals of the first switch circuit is connected to ground.

14 Claims, 8 Drawing Sheets

SIGNAL TRANSCEIVER

CROSS-REFERENCE TO RELATED APPLICATIONS

The present application claims priority to Chinese patent application No. 201410607974.6, filed on Oct. 31, 2014, and entitled "SIGNAL TRANSCEIVER", the entire disclosure of which is incorporated herein by reference.

TECHNICAL FIELD

The present disclosure generally relates to communication technology, and more particularly, to a signal transceiver.

BACKGROUND

Usually, a wireless communication system includes a receiver and a transmitter. When the wireless communication system works in a Time-Division Duplex (TDD) mode, its receiver and transmitter need to share a common antenna. Therefore, a circumscribed transmitter/receiver switch (T/R switch) is required to switch between receiving mode and transmitting mode. In other words, when the wireless communication system is in use, the T/R switch is configured to selectively connect the antenna to the receiver or the transmitter.

In existing wireless communication systems, the T/R switch is connected with the receiver in series. When the wireless communication system works in receiving mode, the T/R switch will be in short circuit state. When the wireless communication system works in transmitting mode, the T/R switch will be in open circuit state.

Furthermore, both the receiver and the transmitter have a complicated circuit structure, thus when the circumscribed T/R switch is introduced, it is hard to make the wireless communication system having a low insertion loss.

SUMMARY

According to one embodiment of the present disclosure, a signal transceiver is provided. The signal transceiver includes: a signal convert circuit adapted to convert single-ended signals into differential signals, a first power amplifier, a receiving amplifier, an impedance convert circuit, a first capacitive circuit, a second capacitive circuit, and a first switch circuit; wherein output terminals of the signal convert circuit are coupled to output terminals of the first power amplifier and a first set of terminals of the first capacitive circuit; wherein a second set of terminals of the first capacitive circuit is coupled to a first set of terminals of the impedance convert circuit; wherein a second set of terminals of the impedance convert circuit is coupled to input terminals of the receiving amplifier and a first set of terminals of the second capacitive circuit; wherein a second set of terminals of the second capacitive circuit is coupled to a first set of terminals of the first switch circuit; and wherein a second set of terminals of the first switch circuit is grounded.

In some embodiments, the first capacitive circuit includes a first capacitor and a second capacitor; and wherein the first set of terminals of the first capacitive circuit includes a first terminal of the first capacitor and a first terminal of the second capacitor, and the second set of terminals of the first capacitive circuit includes a second terminal of the first capacitor and a second terminal of the second capacitor.

In some embodiments, the first capacitive circuit includes a first capacitor and a second capacitor; and wherein the first set of terminals of the first capacitive circuit includes a first terminal of the first capacitor and a first terminal of the second capacitor, and the second set of terminals of the first capacitive circuit includes a second terminal of the first capacitor and a second terminal of the second capacitor.

In some embodiments, the second capacitive circuit includes a third capacitor and a fourth capacitor; and wherein the first set of terminals of the second capacitive circuit includes a first terminal of the third capacitor and a first terminal of the fourth capacitor, and the second set of terminals of the second capacitive circuit includes a second terminal of the third capacitor and a second terminal of the fourth capacitor.

In some embodiments, the first switch circuit includes a first switch and a second switch; and wherein the first set of terminals of the first switch circuit includes a first terminal of the first switch and a first terminal of the second switch, the second set of terminals of the first switch circuit includes a second terminal of the first switch and a second terminal of the second switch, and control terminals of the first switch and the second switch are coupled with each other.

In some embodiments, the first switch circuit includes a first switch, a second switch, and a third switch; wherein a first terminal of the first switch is coupled to a first terminal of the third switch, a first terminal of the second switch is coupled to a second terminal of the third switch, and the first set of terminals of the first switch circuit includes the first terminal of the third switch and the second terminal of the third switch; wherein the second set of terminals of the first switch circuit includes the second terminal of the first switch and the second terminal of the second switch; and wherein a control terminal of the first switch is coupled with a control terminal of the second switch; and.

In some embodiments, the first switch circuit is disposed on a chip and the impedance convert circuit is disposed off the chip.

In some embodiments, the impedance convert circuit includes an integrated passive device or an off-chip passive device.

In some embodiments, the signal transceiver further includes a first control unit which is configured to: when in a transmitting mode, enable the first power amplifier, connect the first switch circuit, and disable the receiving amplifier; and when in a receiving mode, disable the first power amplifier, disconnect the first switch circuit, and enable the receiving amplifier.

In some embodiments, the signal transceiver further includes a match circuit which is configured to: convert impedance outputted from the signal convert circuit to load impedance required by the impedance convert circuit, wherein the output terminals of the signal convert circuit are coupled to the output terminals of the first power amplifier and the first set of terminals of the first capacitive circuit through the match circuit, or the output terminals of the first power amplifier are coupled to the output terminals of the signal convert circuit and the first set of terminals of the first capacitive circuit through the match circuit.

In some embodiments, the signal transceiver further includes a second power amplifier, wherein output terminals of the second power amplifier are coupled to the second set of terminals of the impedance convert circuit.

In some embodiments, the signal transceiver further includes a second control unit which is configured to: when in a transmitting mode, enable the first power amplifier, disable the second power amplifier, connect the first switch circuit, and disable the receiving amplifier, such that the first power amplifier is in use, or disable the first power amplifier, enable the second power amplifier, disconnect the first switch circuit, and disable the receiving amplifier, such that the second power amplifier is in use; and when in a receive mode, disable the first power amplifier, disable the second power amplifier, disconnect the first switch circuit, and enable the receiving amplifier.

In some embodiments, the signal transceiver further includes a third capacitive circuit and a second switch circuit; wherein the input terminals of the receiving amplifier are coupled to the second set of terminals of the impedance convert circuit, the first set of terminals of the second capacitive circuit and the output terminals of the second power amplifier through the third capacitive circuit; and wherein a first set of terminals of the second switch circuit is coupled to the third capacitive circuit and the output terminals of the receiving amplifier, and a second set of terminals of the second switch circuit is grounded.

In some embodiments, the third capacitive circuit includes a fifth capacitor and a sixth capacitor; wherein a first terminal of the fifth capacitor and a first terminal of the sixth capacitor are both coupled to the output terminals of the second power amplifier; and wherein a second terminal of the fifth capacitor and a second terminal of the sixth capacitor are both coupled to input terminals of the second power amplifier.

In some embodiments, the second switch circuit includes a fourth switch and a fifth switch; wherein the first set of terminals of the second switch circuit includes a first terminal of the fourth switch and a first terminal of the fifth switch; and wherein the second set of terminals of the second switch circuit includes a second terminal of the fourth switch and a second terminal of the fifth switch.

In some embodiments, the second switch circuit includes a fourth switch, a fifth switch and a sixth switch; wherein a first terminal of the fourth switch is coupled to a first terminal of the sixth switch, a first terminal of the fifth switch is coupled to a second terminal of the sixth switch, and a control terminal of the fourth switch is coupled to a control terminal of the fifth switch; wherein the first set of terminals of the second switch circuit includes the first terminal and the second terminal of the sixth switch; and wherein the second set of terminals of the second switch circuit includes a second terminal of the fourth switch and a second terminal of the fifth switch.

In some embodiments, the signal transceiver further includes a third control unit which is configured to: when in a transmitting mode, enable the first power amplifier, disable the second power amplifier, connect the first switch circuit, connect the second switch circuit, and disable the receiving amplifier, such that the first power amplifier is in use, or disable the first power amplifier, enable the second power amplifier, disconnect the first switch circuit, connect the second switch circuit and disable the receiving amplifier, such that the second power amplifier is in use; and when in a receiving mode, disable the first power amplifier, disable the second power amplifier, disconnect the first switch circuit, disconnect the second switch circuit, and enable the receiving amplifier.

Accordingly, the signal transceiver provided by the present disclosure includes a first capacitive circuit, and the first switch circuit is disposed between the impedance convert circuit and the receiving amplifier, thus convert efficiency of the impedance convert circuit can be improved. Furthermore, the impedance convert circuit can be disposed off the chip. Therefore, quality factor of the impedance convert circuit can be improved and insertion loss of the signal transceiver can be reduced. Further, an area occupied by the chip can be decreased, thus cost of the signal transceiver can be reduced.

DETAILED DESCRIPTION

In order to clarify the objects, characteristics and advantages of the present disclosure, embodiments of the present disclosure will be described in detail in conjunction with the accompanying drawings. The disclosure will be described with reference to certain embodiments. Accordingly, the present disclosure is not limited to the embodiments disclosed. It will be understood by those skilled in the art that various changes may be made without departing from the spirit or scope of the disclosure.

Figure 1:
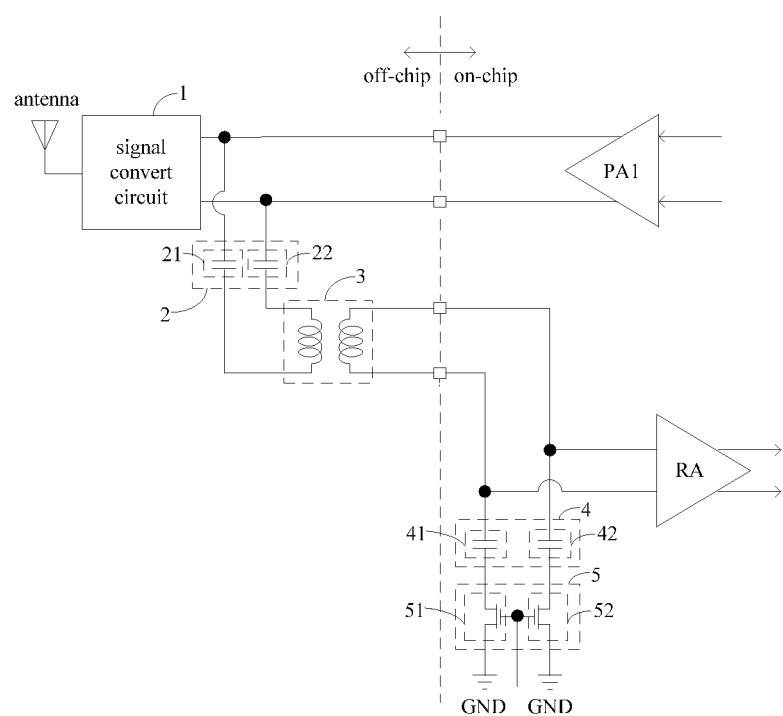
FIG. 1 schematically illustrates a first structure of a signal transceiver according to one embodiment of the present disclosure.

Referring to FIG. 1, a signal transceiver according to one embodiment of the present disclosure is illustrated. The signal transceiver includes: a signal convert circuit 1 which is adapted to convert single-ended signals into differential signals, a first power amplifier PA1, a receiving amplifier RA, a first capacitive circuit 2, an impedance convert circuit 3, a second capacitive circuit 4, and a first switch circuit 5.

As shown, output terminals of the signal convert circuit 1 are coupled to output terminals of the first power amplifier PA1 and a first set of terminals of the first capacitive circuit 2. A second set of terminals of the first capacitive circuit 2 is coupled to a first set of terminals of the impedance convert circuit 3. A second set of terminals of the impedance convert circuit 3 is coupled to output terminals of the receiving amplifier RA and a first set of terminals of the second capacitive circuit 4. A second set of terminals of the second capacitive circuit 4 is coupled to a first set of terminals of the first switch circuit 5. A second set of terminals of the first switch circuit 5 is connected to ground GND.

Specifically, the first capacitive circuit 2 includes a first capacitor 21 and a second capacitor 22; wherein the first set of terminals of the first capacitive circuit 2 includes a first terminal of the first capacitor 21 and a first terminal of the second capacitor 22; and the second set of terminals of the first capacitive circuit 2 includes a second terminal of the first capacitor 21 and a second terminal of the second capacitor 22.

The second capacitive circuit 4 includes a third capacitor 41 and a fourth capacitor 42; wherein the first set of terminals of the second capacitive circuit 4 includes a first terminal of the third capacitor 41 and a first terminal of the fourth capacitor 42; and the second set of terminals of the second capacitive circuit 4 includes a second terminal of the third capacitor 41 and a second terminal of the fourth capacitor 42.

The first switch circuit 5 includes a first switch 51 and a second switch 52; wherein the first set of terminals of the first switch circuit 5 includes a first terminal of the first switch 51 and a first terminal of the second switch 52; and the second set of terminals of the first switch circuit 5 includes a second terminal of the first switch 51 and a second terminal of the second switch 52. Furthermore, a control terminal of the first switch 51 and a control terminal of the second switch 52 may be coupled with each other. In some embodiments, the first switch 51 and the second switch 52 may be MOS (Metal Oxide Semiconductor) transistors, wherein the control terminal of the first switch and the control terminal of the second switch 52 are gates of the MOS transistors. Accordingly, when the first switch 51 and the second switch 52 are both closed, the switch circuit will be in a closed circuit state; and when the first switch 51 and the second switch 52 are both opened, the switch circuit will be in an open circuit state.

The signal convert circuit 1 may further have an input terminal which is coupled to an antenna. The signal convert circuit 1, the first power amplifier PA1, and the receiving amplifier RA are able to be achieved through existing ways, which will not illustrated in detail herein.

The signal transceiver may further include a first control unit. The first control unit is configured to: when the signal transceiver is in a transmitting mode, enable the first power amplifier PA1, make the first switch circuit 5 in the closed circuit state, and disable the receiving amplifier RA, such that a transmit circuit is connected and a receive circuit is disconnected; and when the signal transceiver is in a receiving mode, disable the first power amplifier PA1, make the first switch circuit 5 in the open circuit state, and enable the receiving amplifier RA, such that the transmit circuit is disconnected and the receive circuit is connected.

When the signal transceiver is in the transmitting mode, signals outputted from the first power amplifier PA1 will pass through the signal convert circuit 1 and be transmitted to the antenna. Accordingly, the signal convert circuit 1 servers as a match circuit, while the first capacitive circuit 2, the impedance convert circuit 3, and the second capacitive circuit 4 server as an auxiliary match circuit of the signal convert circuit 1.

When the signal transceiver is in the receiving mode, signals received by the antenna will successively pass through the signal convert circuit 1, the first capacitive circuit 2, and the impedance convert circuit 3 and transmitted to the receiving amplifier RA.

Taking integration level, performance and cost of the signal transceiver into consideration, the first switch circuit 5 may be disposed on a chip. Furthermore, the signal transceiver includes the first capacitive circuit 2 and the second capacitive circuit 4, wherein the second capacitive circuit 4 is adapted to block direct current (DC) signals and allow alternating current (AC) signals passing through, thus the first switch circuit 5 is able to be disposed between the impedance convert circuit 3 and the receiving amplifier RA.

Therefore, a convert efficiency of the impedance convert circuit 3 is able to be improved, and the impedance convert circuit 3 is able to be disposed off the chip. When the impedance convert circuit 3 is disposed off the chip, an integrated passive device (IPD) or an off-chip passive device can be applied to achieve the impedance convert circuit 3, such that the impedance convert circuit 3 will have a high quality factor. Accordingly, the insertion loss of the signal transceiver can be reduced. Further, an area occupied by the chip can be decreased, thus cost of the signal transceiver can be reduced.

Figure 2:
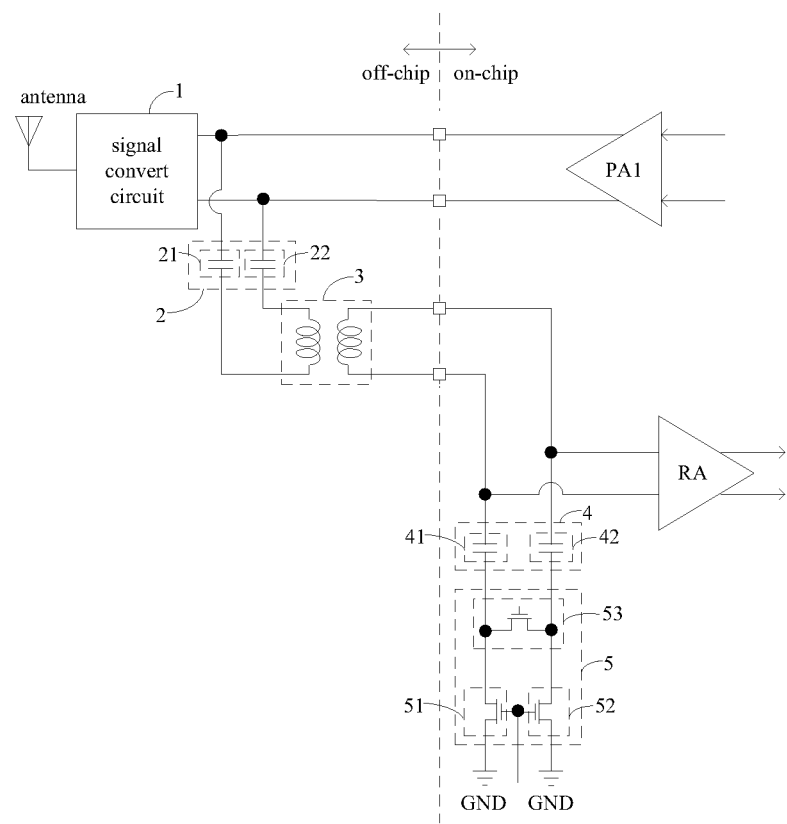
FIG. 2 schematically illustrates a second structure of a signal transceiver according to one embodiment of the present disclosure.

Referring to FIG. 2, a signal transceiver according to one embodiment of the present disclosure is illustrated, which is similar to the signal transceiver illustrated in FIG. 1, except that the first switch circuit 5 further includes a third switch 53.

As shown, the first terminal of the first switch 51 is coupled to a first terminal of the third switch 53, and the first terminal of the second switch 52 is coupled to a second terminal of the third switch. The first set of terminals of the first switch circuit 5 includes the first terminal of the third switch 53 and the second terminal of the third switch 53. The second set of terminals of the first switch circuit 5 includes the second terminal of the first switch 51 and the second terminal of the second switch 52. Further, the control terminal of the first switch 51 and the control terminal of the second switch 52 are coupled together. Accordingly, when the first switch 51, the second switch 52 and the third switch are all closed, the switch circuit will be in the closed circuit state; and when the first switch 51, the second switch 52 and the third switch are all opened, the switch circuit will be in the open circuit state.

Figure 3:
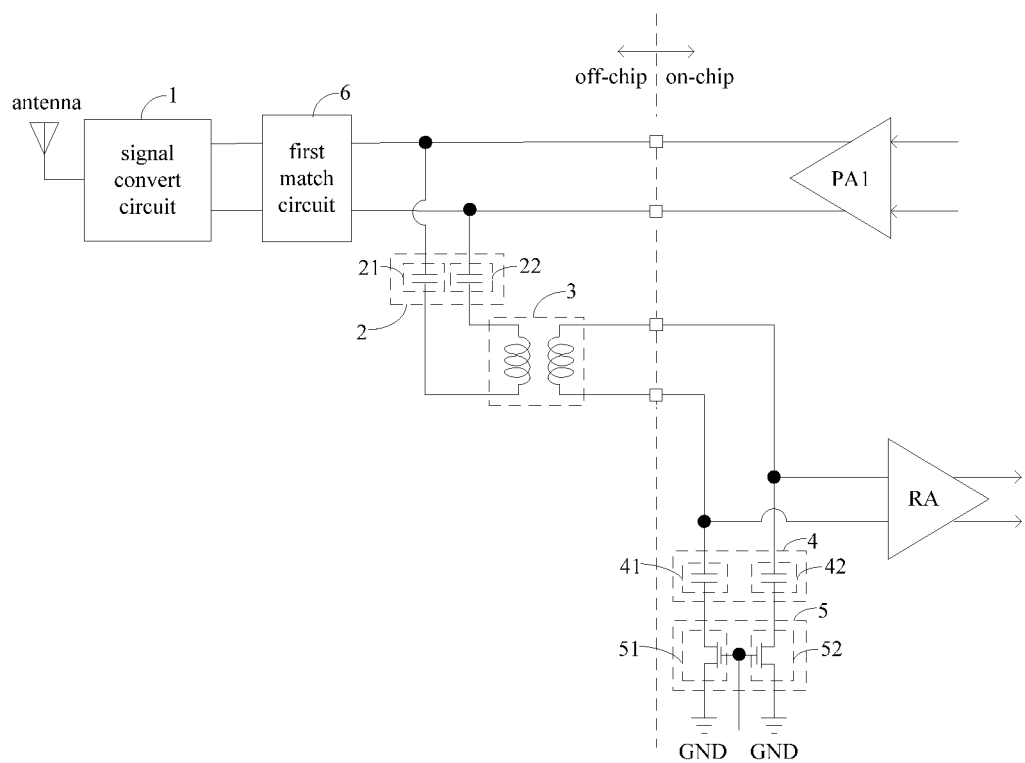
FIG. 3 schematically illustrates a third structure of a signal transceiver according to one embodiment of the present disclosure.

Referring to FIG. 3, a signal transceiver according to one embodiment of the present disclosure is illustrated, which is similar to the signal transceiver illustrated in FIG. 1, except that the signal transceiver further includes a first match circuit 6.

As shown, the output terminals of the signal convert circuit 1 are coupled to the output terminals of the first power amplifier PA1 and the first set of terminals of the first capacitive circuit 2 through the first match circuit 6. The first match circuit 6 is adapted to convert impedance outputted from the signal convert circuit 1 into load impedance required by the first power amplifier PA1.

Figure 4:
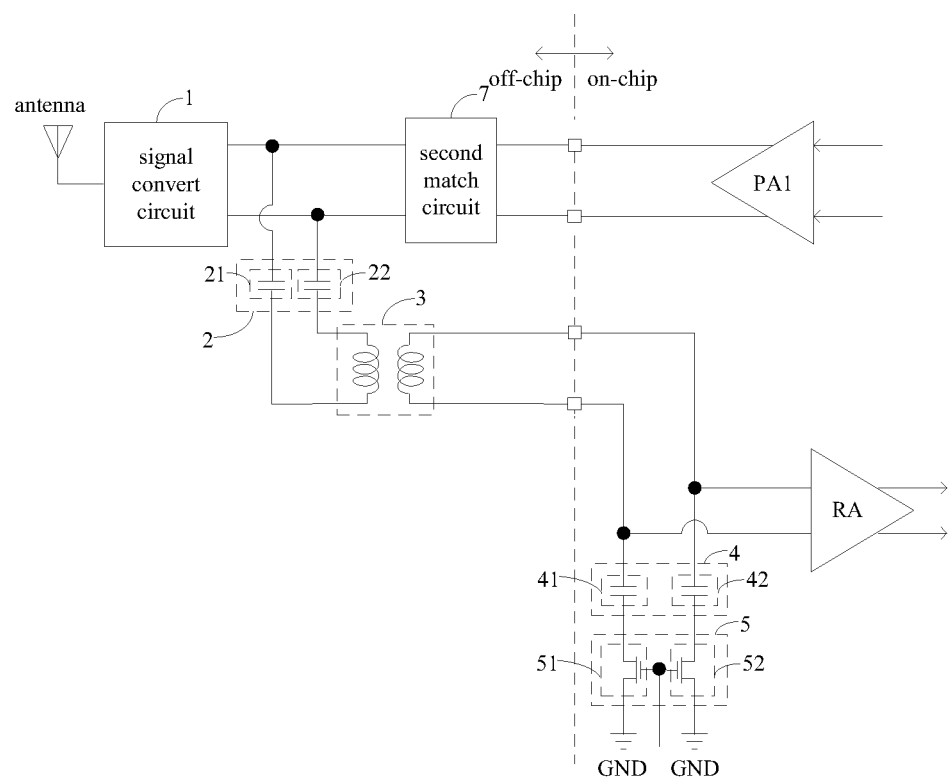
FIG. 4 schematically illustrates a fourth structure of a signal transceiver according to one embodiment of the present disclosure.

Referring to FIG. 4, a signal transceiver according to one embodiment of the present disclosure is illustrated, which is similar to the signal transceiver illustrated in FIG. 1, except that the signal transceiver further includes a second match circuit 7.

As shown, the output terminals of the first power amplifier PA1 are coupled to the output terminals of the signal convert circuit 1 and the first set of terminals of the first capacitive circuit 2 through the second match circuit 7. The second match circuit 7 is adapted to convert impedance outputted from the signal convert circuit 1 into load impedance required by the first power amplifier PA1.

Figure 5:
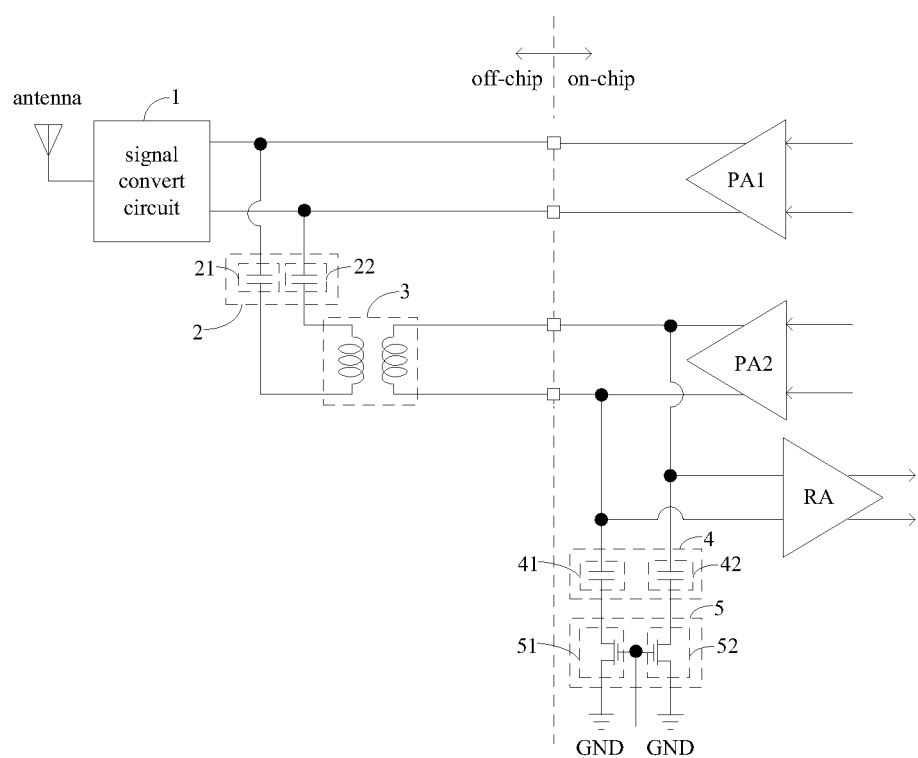
FIG. 5 schematically illustrates a fifth structure of a signal transceiver according to one embodiment of the present disclosure.

Referring to FIG. 5, a signal transceiver according to one embodiment of the present disclosure is illustrated, which is similar to the signal transceiver illustrated in FIG. 1, except that the signal transceiver further includes a second power amplifier PA2. As shown, output terminals of the second power amplifier PA2 are coupled to the second set of terminals of the impedance convert circuit 3.

When the signal transceiver is configured to have the second power amplifier PA2, the signal transceiver may further include a second control unit.

The second control unit is configured to: when the signal transceiver is in the transmitting mode, enable the first power amplifier PA1, disable the second power amplifier PA2, make the first switch circuit 5 in the closed circuit state, and disable the receiving amplifier RA, such that a first transmit circuit is connected, a second transmit circuit is disconnected, and a receive circuit is disconnected. Accordingly, the first power amplifier PA1 is enabled and in use, thus signals outputted from the first power amplifier PA1 can pass through the signal convert circuit 1 and transmitted to the antenna.

The second control unit is further configured to: when the signal transceiver is in the transmitting mode, disable the first power amplifier PA1, enable the second power amplifier PA2, make the first switch circuit 5 in the open circuit state, and disable the receiving amplifier RA, such that the first transmit circuit is disconnected, the second transmit circuit is connected, and the receive circuit is disconnected. Accordingly, the second power amplifier PA2 is enabled and in use, thus signals outputted from the second power amplifier PA2 can successively pass through the impedance convert circuit 3, the first capacitive circuit 2, and the signal convert circuit 1 and transmitted to the antenna.

The second control unit is further configured to: when the signal transceiver is in the receiving mode, disable the first power amplifier PA1, disable the second power amplifier PA2, make the first switch circuit 5 in the open circuit state, and enable the receiving amplifier RA, such that the first transmit circuit is disconnected, the second transmit circuit is disconnected, and the receive circuit is connected. Accordingly, signals received by the antenna can successively pass through the signal convert circuit 1, the first capacitive circuit 2, and the impedance convert circuit 3 and transmitted to the receiving amplifier RA.

Figure 6:
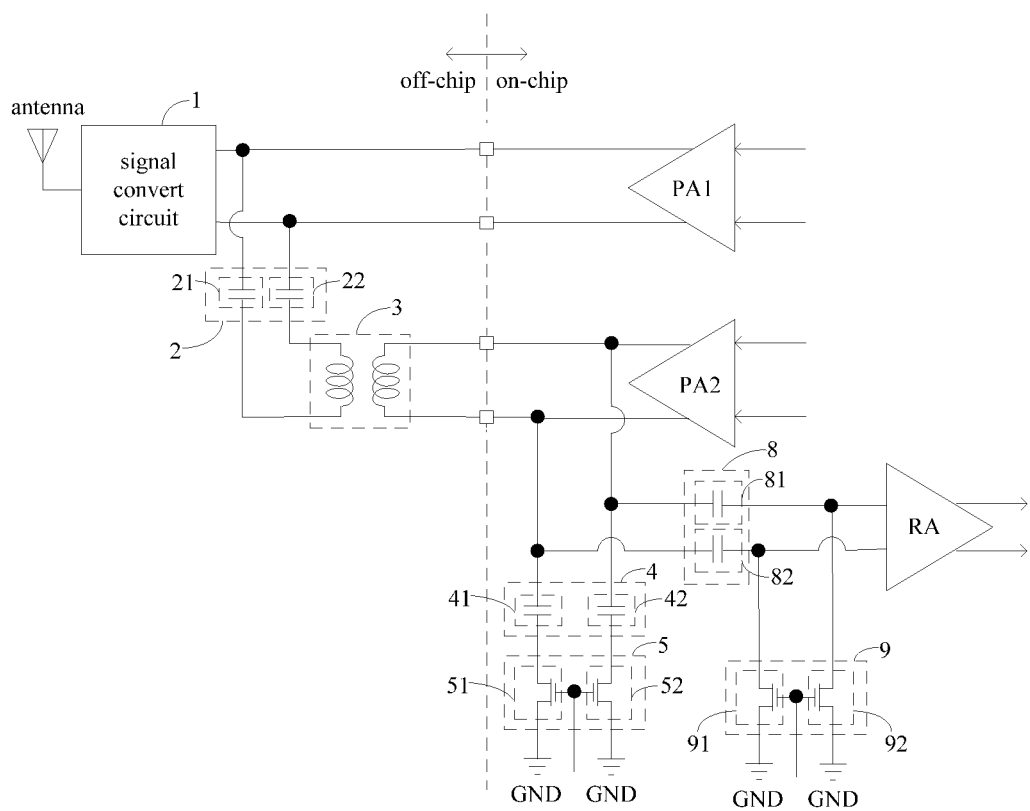
FIG. 6 schematically illustrates a sixth structure of a signal transceiver according to one embodiment of the present disclosure.

Referring to FIG. 6, a signal transceiver according to one embodiment of the present disclosure is illustrated, which is similar to the signal transceiver illustrated in FIG. 5, except that the signal transceiver further includes a third capacitive circuit 8 and a second switch circuit 9.

As shown, the input terminals of the receiving amplifier RA are coupled to the second set of terminals of the impedance convert circuit 3, the first set of terminals of the second capacitive circuit 4, and the output terminals of the second power amplifier PA2 through the third capacitive circuit 8. A first set of terminals of the second switch circuit 9 is coupled to the third capacitive circuit 8 and the input terminals of the receiving amplifier RA. A second set of terminals of the second switch 9 is coupled to ground GND.

The third capacitive circuit 8 includes a fifth capacitor 81 and a sixth capacitor 82, wherein a first terminal of the fifth capacitor 81 and a first terminal of the sixth capacitor 82 are both coupled to the output terminals of the second power amplifier PA2, and a second terminal of the fifth capacitor 81 and a second terminal of the sixth capacitor 82 are both coupled to the input terminals of the second power amplifier PA2.

The second switch circuit 9 includes a fourth switch 91 and a fifth switch 92. The first set of terminals of the second switch circuit includes a first terminal of the fourth switch 91 and a first terminal of the fifth switch 92. The second set of terminals of the second switch circuit includes a second terminal of the fourth switch 91 and a second terminal of fifth switch 92. Accordingly, when the fourth switch 91 and the fifth switch 92 are both closed, the switch circuit will be in the closed circuit state; and when the fourth switch 91 and the fifth switch 92 are both opened, the switch circuit will be in the open circuit state.

When the signal transceiver is configured to include the second power amplifier PA2, the third capacitive circuit 8, and the second switch circuit 9, a third control unit may be included as well.

The third control unit is configured to: when the signal transceiver is in the transmitting mode, enable the first power amplifier PA1, disable the second power amplifier PA2, make the first switch circuit 5 in the close circuit state, make the second switch circuit 9 in the closed circuit state, and disable the receiving amplifier RA, such that a first transmit circuit is connected, a second transmit circuit is disconnected, and a receive circuit is disconnected. Accordingly, the first power amplifier PA1 is enabled and in use, thus signals outputted from the first power amplifier PA1 can pass through the signal convert circuit 1 and transmitted to the antenna.

The third control unit is further configured to: when the signal transceiver is in the transmitting mode, disable the first power amplifier PA1, enable the second power amplifier PA2, make the first switch circuit 5 in the open circuit state, make the second switch circuit 9 in the close circuit state, and disable the receiving amplifier RA, such that the first transmit circuit is disconnected, the second transmit circuit is connected, and the receive circuit is disconnected. Accordingly, the second power amplifier PA2 is in use, and signals outputted from the second power amplifier PA2 successively pass through the impedance convert circuit 3, the first capacitive circuit 2, and the signal convert circuit 1 and transmitted to the antenna. Therefore, the third capacitive circuit 8 is able to reduce the fluctuation of signals output, so as to avoid the receiving amplifier RA from being damaged.

The third control unit is further configured to: when the signal transceiver is in the receiving mode, disable the first power amplifier PA1, disable the second power amplifier PA2, make the first switch circuit 5 in the open circuit state, make the second switch circuit 9 in the open circuit state, and enable the receiving amplifier RA, such that the first transmit circuit is disconnected, the second transmit circuit is disconnected, and the receive circuit is connected. Accordingly, signals received by the antenna successively pass through the signal convert circuit 1, the first capacitive circuit 2, the impedance convert circuit 3, and the third capacitive circuit 8 and transmitted to the receiving amplifier RA.

Figure 7:
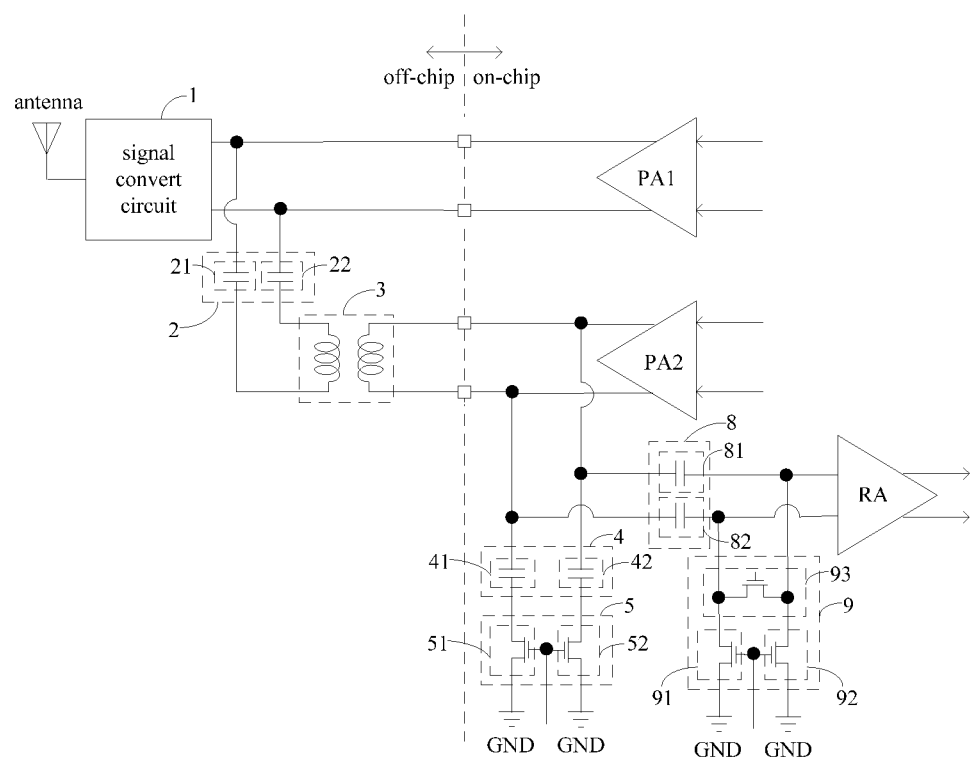
FIG. 7 schematically illustrates a seventh structure of a signal transceiver according to one embodiment of the present disclosure.

Referring to FIG. 7, a signal transceiver according to one embodiment of the present disclosure is illustrated, which is similar to the signal transceiver illustrated in FIG. 6, except that the second switch circuit 9 further includes a sixth switch 93.

As shown, a first terminal of the sixth switch 93 is coupled to the first terminal of the fourth switch 91, and a second terminal of the sixth switch 93 is coupled to the first terminal of the fifth switch 92. The first set of terminals of the second switch circuit 9 includes the first terminal and the second terminal of the sixth switch 93. The second set of terminals of the second switch circuit 9 includes the second terminal of the fourth switch 91 and the second terminal of the fifth switch 93. Further, the control terminal of the fourth switch 91 and the control gate of the fifth switch 92 are coupled together. Accordingly, when the fourth switch 91, the fifth switch 92 and the sixth switch 93 of the second switch circuit 9 are all closed, the second switch circuit 9 will be in the closed circuit state; and when the fourth switch 91, the fifth switch 92, and the sixth switch 93 of the second switch circuit 9 are all opened, the switch circuit will be in the open circuit state.

Figure 8:
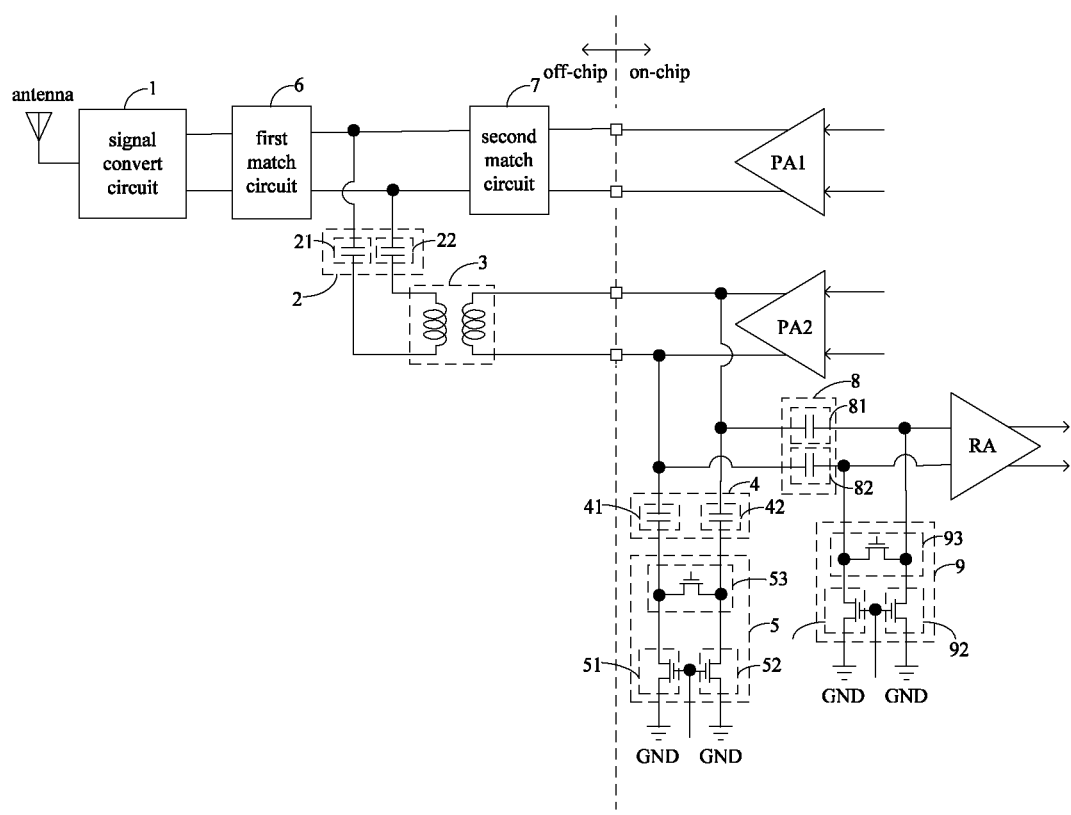
FIG. 8 schematically illustrates an eighth structure of a signal transceiver according to one embodiment of the present disclosure.

Referring to FIG. 8, a signal transceiver according to one embodiment of the present disclosure is illustrated, the signal transceiver include: the first match circuit 6, the second match circuit 7, the third capacitive circuit 8, the second switch circuit 9, and the second power amplifier PA2, wherein the first switch circuit 5 include the first switch 51, the second switch 52 and the third switch 53, the second switch circuit 9 include the fourth switch 91, the fifth switch 92 and the sixth switch 93. Accordingly, the first match circuit 6 and the second match circuit 7 corporate with each other to convert impedance outputted from the signal convert circuit 1 to load impedance required by the first power amplifier PA1. It should be noted that, working processes of the signal transceiver in the transmitting mode and the receiving mode are similar to previous embodiments recited above, which will not illustrated in detail herein.

The signal convert circuit 1, the first capacitive circuit 2, and the impedance convert circuit 3 may be disposed off the chip. The first power amplifier PA1, the second power amplifier PA2, the receiving amplifier RA, the second capacitive circuit 4, the first switch circuit 4, the first match circuit 6, the second match circuit 7, the third capacitive circuit 8, and the second switch circuit 9 may be disposed on the chip.

Although the present disclosure has been disclosed above with reference to preferred embodiments thereof, it should be understood by those skilled in the art that various changes may be made without departing from the spirit or scope of the disclosure. Accordingly, the present disclosure is not limited to the embodiments disclosed.

What is claimed is:

1. A signal transceiver, comprising:
a signal convert circuit adapted to convert single-ended signals into differential signals, a first power amplifier, a receiving amplifier, an impedance convert circuit, a first capacitive circuit, a second capacitive circuit and a first switch circuit;
wherein output terminals of the signal convert circuit are coupled to output terminals of the first power amplifier and a first set of terminals of the first capacitive circuit;
wherein a second set of terminals of the first capacitive circuit is coupled to a first set of terminals of the impedance convert circuit;
wherein a second set of terminals of the impedance convert circuit is coupled to input terminals of the receiving amplifier and a first set of terminals of the second capacitive circuit;
wherein a second set of terminals of the second capacitive circuit is coupled to a first set of terminals of the first switch circuit; and
wherein a second set of terminals of the first switch circuit is grounded
a second power amplifier, wherein output terminals of the second power amplifier are coupled to the second set of terminals of the impedance convert circuit; and
a third capacitive circuit and a second switch circuit;
wherein the input terminals of the receiving amplifier are coupled to the second set of terminals of the impedance convert circuit, the first set of terminals of the second capacitive circuit and the output terminals of the second power amplifier through the third capacitive circuit; and
wherein a first set of terminals of the second switch circuit is coupled to the third capacitive circuit and the output terminals of the receiving amplifier and a second set of terminals of the second switch circuit is grounded.

2. The signal transceiver according to claim 1, wherein the second capacitive circuit comprises a third capacitor and a fourth capacitor; and
wherein the first set of terminals of the second capacitive circuit comprises a first terminal of the third capacitor and a first terminal of the fourth capacitor, and the second set of terminals of the second capacitive circuit comprises a second terminal of the third capacitor and a second terminal of the fourth capacitor.

3. The signal transceiver according to claim 1, wherein the first switch circuit comprises a first switch and a second switch; and
wherein the first set of terminals of the first switch circuit comprises a first terminal of the first switch and a first terminal of the second switch, the second set of terminals of the first switch circuit comprises a second terminal of the first switch and a second terminal of the second switch, and control terminals of the first switch and the second switch are coupled with each other.

4. The signal transceiver according to claim 1, wherein the first switch circuit comprises a first switch, a second switch, and a third switch;
wherein a first terminal of the first switch is coupled to a first terminal of the third switch, a first terminal of the second switch is coupled to a second terminal of the third switch, and the first set of terminals of the first switch circuit comprises the first terminal of the third switch and the second terminal of the third switch;
wherein the second set of terminals of the first switch circuit comprises the second terminal of the first switch and the second terminal of the second switch; and
wherein a control terminal of the first switch is coupled with a control terminal of the second switch.

5. The signal transceiver according to claim 1, wherein the first switch circuit is disposed on a chip and the impedance convert circuit is disposed off the chip.

6. The signal transceiver according to claim 5, wherein the impedance convert circuit comprises an integrated passive device or an off-chip passive device.

7. The signal transceiver according to claim 1, further comprising a first control unit which is configured to:
when in a transmitting mode, enable the first power amplifier, connect the first switch circuit, and disable the receiving amplifier; and
when in a receiving mode, disable the first power amplifier, disconnect the first switch circuit, and enable the receiving amplifier.

8. The signal transceiver according to claim 1, further comprising a match circuit which is configured to:
convert impedance outputted from the signal convert circuit to load impedance required by the impedance convert circuit, wherein the output terminals of the signal convert circuit are coupled to the output terminals of the first power amplifier and the first set of terminals of the first capacitive circuit through the match circuit, or the output terminals of the first power amplifier are coupled to the output terminals of the signal convert circuit and the first set of terminals of the first capacitive circuit through the match circuit.

9. The signal transceiver according to claim 1, further comprising a second control unit which is configured to:
when in a transmitting mode, enable the first power amplifier, disable the second power amplifier, connect the first switch circuit, and disable the receiving amplifier, such that the first power amplifier is in use, or disable the first power amplifier, enable the second power amplifier, disconnect the first switch circuit, and disable the receiving amplifier, such that the second power amplifier is in use; and when in a receive mode, disable the first power amplifier, disable the second power amplifier, disconnect the first switch circuit, and enable the receiving amplifier.

10. The signal transceiver according to claim 1, wherein the first capacitive circuit comprises a first capacitor and a second capacitor; and wherein the first set of terminals of the first capacitive circuit comprises a first terminal of the first capacitor and a first terminal of the second capacitor, and the second set of terminals of the first capacitive circuit comprises a second terminal of the first capacitor and a second terminal of the second capacitor.

11. The signal transceiver according to claim 1, wherein the third capacitive circuit comprises a fifth capacitor and a sixth capacitor;

wherein a first terminal of the fifth capacitor and a first terminal of the sixth capacitor are both coupled to the output terminals of the second power amplifier; and wherein a second terminal of the fifth capacitor and a second terminal of the sixth capacitor are both coupled to input terminals of the second power amplifier.

12. The signal transceiver according to claim 1, wherein the second switch circuit comprises a fourth switch and a fifth switch;

wherein the first set of terminals of the second switch circuit comprises a first terminal of the fourth switch and a first terminal of the fifth switch; and wherein the second set of terminals of the second switch circuit comprises a second terminal of the fourth switch and a second terminal of the fifth switch.

13. The signal transceiver according to claim 1, wherein the second switch circuit comprises a fourth switch, a fifth switch and a sixth switch;

wherein a first terminal of the fourth switch is coupled to a first terminal of the sixth switch, a first terminal of the fifth switch is coupled to a second terminal of the sixth switch, and a control terminal of the fourth switch is coupled to a control terminal of the fifth switch;

wherein the first set of terminals of the second switch circuit comprises the first terminal and the second terminal of the sixth switch; and wherein the second set of terminals of the second switch circuit comprises a second terminal of the fourth switch and a second terminal of the fifth switch.

14. The signal transceiver according to claim 1, further comprises a third control unit which is configured to:

when in a transmitting mode, enable the first power amplifier, disable the second power amplifier, connect the first switch circuit, connect the second switch circuit, and disable the receiving amplifier, such that the first power amplifier is in use, or disable the first power amplifier, enable the second power amplifier, disconnect the first switch circuit, connect the second switch circuit and disable the receiving amplifier, such that the second power amplifier is in use; and when in a receiving mode, disable the first power amplifier, disable the second power amplifier, disconnect the first switch circuit, disconnect the second switch circuit, and enable the receiving amplifier.

* * * * *